(12) United States Patent
Levy

(10) Patent No.: US 7,164,087 B2
(45) Date of Patent: Jan. 16, 2007

(54) KEYPADS WITH MULTI-FUNCTION KEYS

(75) Inventor: David H. Levy, Cambridge, MA (US)

(73) Assignee: Digit Wireless, LLC, Cambridge, MA (US)

(*) Notice: Subject to any disclaimer, the term of this patent is extended or adjusted under 35 U.S.C. 154(b) by 24 days.

(21) Appl. No.: 10/513,904

(22) PCT Filed: May 9, 2003

(86) PCT No.: PCT/US03/14733

§ 371 (c)(1),
(2), (4) Date: Jun. 14, 2005

(87) PCT Pub. No.: WO03/096160

PCT Pub. Date: Nov. 20, 2003

(65) Prior Publication Data

US 2005/0247548 A1    Nov. 10, 2005

Related U.S. Application Data

(60) Provisional application No. 60/401,175, filed on Aug. 5, 2002, provisional application No. 60/379,241, filed on May 10, 2002.

(51) Int. Cl.
*H01H 13/70* (2006.01)

(52) U.S. Cl. ........................ 200/5 A; 200/600

(58) Field of Classification Search ............... 200/5 R, 200/5 A, 6 A, 600, 341, 345, 343; 341/22, 341/23, 26, 31–34; 345/168, 169, 173; 400/472, 400/473, 485, 490, 491, 491.2, 495, 495.1, 400/496

See application file for complete search history.

(56) References Cited

U.S. PATENT DOCUMENTS

| | | | | |
|---|---|---|---|---|
| 5,329,278 A | * | 7/1994 | Dombroski | 341/20 |
| 5,528,235 A | * | 6/1996 | Lin et al. | 341/22 |
| 5,612,690 A | | 3/1997 | Levy et al. | |
| 5,822,703 A | * | 10/1998 | Araki | 341/22 |
| 5,841,374 A | * | 11/1998 | Abraham | 341/32 |
| 5,852,414 A | * | 12/1998 | Yu et al. | 341/22 |
| 5,973,621 A | | 10/1999 | Levy et al. | |
| 6,259,044 B1 | * | 7/2001 | Paratore et al. | 200/5 A |
| 6,528,741 B1 | | 3/2003 | Walker | |
| 6,541,715 B1 | * | 4/2003 | Swanson | 200/5 A |
| 2002/0014395 A1 | | 2/2002 | Walker | |

FOREIGN PATENT DOCUMENTS

| | | |
|---|---|---|
| WO | WO 02/10896 | 7/2001 |
| WO | WO 01/95358 | 12/2001 |

* cited by examiner

*Primary Examiner*—Michael A. Friedhofer
(74) *Attorney, Agent, or Firm*—Fish & Richardson P.C.

(57) ABSTRACT

A keypad has keys (12) protruding through a housing (18) with at least one at-a-distance sensor (20) located approximately equidistant between each adjacent set of keys (12). Each key (12) has a tactile feedback element (32) located below and a primary graphic (10) displayed above. Graphics identifying additional functionality (14) are disposed off-center to primary graphic (10). Locator nubs (16) are located approximately equidistant between each adjacent set of keys (12).

24 Claims, 2 Drawing Sheets

KEYPADS WITH MULTI-FUNCTION KEYS

Further background information on this later arrangment can be found in my pending US provisional patent application Ser. Nos. 60/379,241, filed May 10, 2002, and 60/401,175, filed Aug. 5, 2002, the contents of which are incorporated herein by reference, as if fully set forth.

TECHNICAL FIELD

This invention relates generally to keypads for manual data input, and specifically to such keypads having discrete keys, each key having multiple associated functions.

BACKGROUND

It is desirable to provide a keypad with many outputs (e.g., numerals, letters, punctuation marks, and predefined operations) in a small space, without excessive mechanical complexity, material or service costs. Ideally, each input should be accompanied by a single and well-defined tactile feedback, and each key should be easily and reliably manipulated by a single human finger to provide a desired input. One of the most difficult aspects of keypad design is providing the "right" tactile feel; This apparently simple task is notorious within the industry and widely known without, as people will pick up products and test them (for purchase) simply by pressing the keys, discounting the product if the keys don't "feel" right.

It is further desirable to configure each "traditional" key to provide multiple outputs, preferably up to five outputs per key. By "traditional key" I mean a discrete key or key region disposed over an associated switch element such that when the key is pressed, the switch is closed. Typically, such keys also have associated, discrete tactile feedback elements, some of which (such as poly or metal snap domes) also provide the discrete switch function.

Some keypad layouts and key associations have developed universal recognition as a standard. For example, the standard 12-key telephone keypad layout has established an association between numbers and letters, the letters "ABC" being associated with the number "2", "PQRS" associated with the number "7", and so forth. Throughout this application, the telephone keypad is used as an example of one application of the present invention. However, the technology is not necessarily limited to use with telephone keypads, but is applicable to any keypad with keys having associated central functions (e.g., the "numbers" of the telephone keypad) and peripheral functions (e.g., the letters of the telephone keypad). Any symbols, alphanumeric or others, may be used.

SUMMARY

The present invention features a keypad having an array of keys or key regions each having an associated central function and one or more associated peripheral functions. The central function is activated by manually engaging (i.e., pressing or touching) a central region of the key, while each peripheral function is activated by manually engaging a peripheral region (i.e., a region offset from the center) of the key.

In presently preferred embodiments, the keypad contains discrete switches that underlie associated keys and that are activated in the absence of any other input to produce an output associated with the central function of the key. The switches can be of any traditional technology known to those of skill in the art of keypad design, such as snap dome switches. Additionally, the keypad contains an array of at-a-distance finger position sensors that are each responsive to an offset position of a finger activating the switch of a given key.

In some arrangements, the finger position sensors are disposed between adjacent keys. Where more than two functions per key are desired, each key will preferably have more than one adjacent position sensor, each sensor corresponding to a different key output. The sensors could be formed into a large single array.

The at-a-distance finger sensing may be accomplished by various means, such as capacitive and reflected infrared technologies, although capacitance sensing is presently preferred.

In some embodiments, a single discrete capacitive sensor is located approximately equidistant between traditional keys. By measuring absolute or relative capacitive variations, the system determines whether the user's finger is centered over the key, or intentionally off-center. If the finger is off-center, the system interprets this to mean that the user intends to access an auxiliary function, preferably a function represented graphically off-center of the selected key and in the direction in which the user has placed her finger. Because each sensor is fixed in location on the keypad, the user's intent may be readily determined.

In some cases, small nubs are included between the keys to provide the user a tactue reference to assist in locating her finger correctly off-center.

In some applications, a plurality of sensors is disposed at each interstitial area between adjacent keys. These sensors may be functionally organized into sets so that the system may determine the orientation of the user's finger relative to a key. When a key switch under a particular key is activated, the system interprets which of the multiple functions associated with that key is intended, based upon sensed finger position relative to the center of the key.

Preferably, each key is provided with a central graphical element corresponding to the central function of the key. It is also preferred that each peripheral function be identified by a separate graphical element, either marked on the key itself or on a housing surface adjacent the key.

The keypad may be in the form of a substrate assembled into a housing defining apertures through which individual keys project, or may be in the form of an exposed substrate.

According to another aspect of the invention, a method is provided for determining user input from a keypad having a defined set of physical keys that protrude through holes in a housing, each key having an underlying electrical switch. The method includes detecting activation of a switch corresponding to one of the keys, and detecting finger position with so respect to a central region of the key corresponding to the activated switch, based on signals from an array of at-a-distance finger sensors within the keypad. Upon detecting a finger position offset from the central region of the key, an output is provided corresponding to a peripheral function associated with the key. Otherwise, an output is provided corresponding to a central function associated with the key.

In some cases, each key is labeled both with a graphic corresponding to its central function and one or more graphics corresponding with its peripheral functions. In some other cases, each key is labeled both with a graphic corresponding to its central function, and the housing is labeled with graphics corresponding with peripheral functions of the keys.

Various aspects of the invention can reduce the keypad space necessary to support a given number of functions, by providing multiple functions per key, without requiring the manipulation of multiple keys for each added function. With appropriate graphics, each function of a multi-function key is independently and directly and intuitively accessible by untrained operators. Furthermore, these additional functions may be obtained without increasing the number of contacting switches and tactile feedback elements. In the case of a traditional telephone layout with twelve discrete keys having twelve associated switches and tactile elements, for example, including the ability to sense finger offsets toward four separate quadrants per key enables a full 60 outputs (i.e., five per key).

One of the advantages of these embodiments is that stand tactile feedback switch elements and implementation may be utilized, so that the designers may fully benefit from the years of experience they have in providing the users a specific quality of switch and feel performance. Likewise, users benefit from the tactile experience they have come to expect from keypads in general, and/or from the quality standard of a particular brand.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
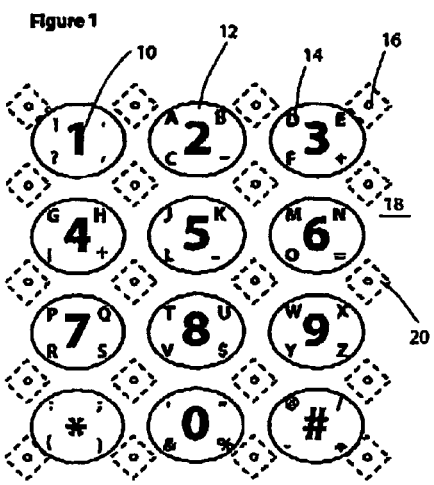
FIG. 1 shows an exposed surface of a first keypad.

FIG. 1 shows a telephone keypad with alphabet and punctuation characters available for output by auxiliary function graphics 14. In this embodiment, the primary graphic characters 10 are numeric and located on the centers of traditional keys 12, and auxiliary function graphics 14 (shown here as alphabetic) are disposed on the traditional keys 12 to the upper left, lower left, upper right, and lower right. With this arrangement, the system can not only determine finger position with respect to those four quadrants, but by various combinations of signals from the sensors 20, can also determine finger position above, below, left and right. Locator nubs 16 are disposed on the housing 18 approximately equidistant from adjacent keys, and are also included around the periphery, spaced to complete the pattern. The size of optional locator nubs 16 is preferably quite small, just large enough to be felt; thereby providing the user a tactile reference to assist in locating her finger correctly off-center. Whether locator nubs 16 are utilized or not, interstitial sensors 20 enable detection of whether the user's finger is disposed centrally over the traditional key 12 and, if not centered, an indication as to which quadrant the finger is displaced toward. For example, if the four sensors around the number "8" indicate that the finger is centered over the key, the system will produce the output "8" when the underlying switch 30 is activated. If the four sensors around the number "8" indicate that the finger is displaced to the lower left, the system will produce the output "V" when the switch 30 is activated. In all cases the user is able to use one finger to press a single key and to receive a single feedback. The purpose of locator nubs 16 is to aid the user in positioning the finger correctly, to indicate how far off-center the finger 25 should be placed to conclusively establish the user intends an auxiliary function. Locator nubs 16 may be a variety of shapes such as a small pip, mound or circle.

Figure 2:
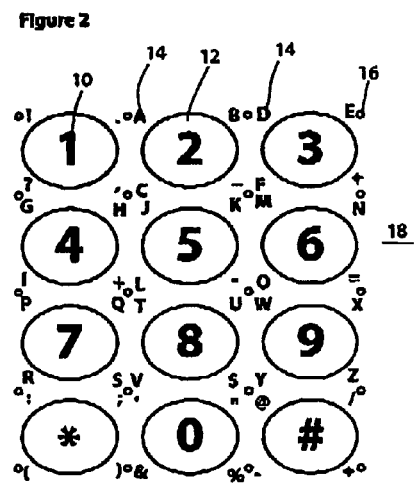
FIG. 2 shows an exposed surface of a second keypad.

FIG. 2 shows an alternate embodiment in which the graphics identifying the additional characters are located on the housing 18. This embodiment is otherwise the same as the one of FIG. 1, although the finger position sensors have been omitted for clarity. Each auxiliary function graphic 14 is associated With the switch 30 (and thereby primary graphic character 10) located closest to it.

Figure 3:
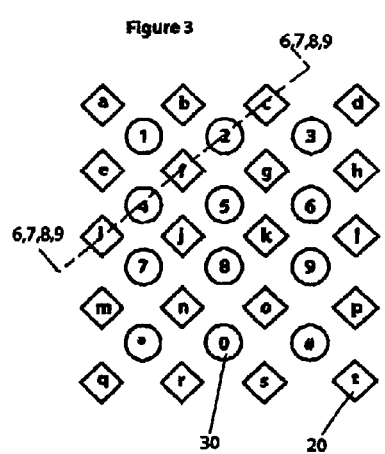
FIGS. 3–5 show alternative arrangements of sensors and switches, useful with either of the illustrated keypads.

FIG. 3 shows an array of sensors 20 and switches 30. Each switch 30 is disposed below a traditional key of a keypad. The switches 30 may be rubber domes, poly domes, metal domes or the like. In this embodiment, the switches 30 are independently addressable, either with independent lines, an array, or multiplexed. More importantly, each sensor 20 is associated with a single interstitial area between switches 30. Each sensor 20 may consist of a single conductive plate, forming one side of a capacitor, the other side of the capacitor being provided by the activating finger. Alternatively, each sensor 20 may comprise two conductive plates forming two sides of an "open" capacitor, the presence of a sensed finger providing the effect of creating two capacitors in series, as well as having a parasitic effect. In another example, each sensor 20 is the intersection of two perpendicular grids of sense lines. Many other capacitive sense technologies are known in the art, and are found in various applications, such as touch-sensitive elevator buttons.

To operate the keypad to produce a desired output, the user simply locates his or her finger over the graphic corresponding to the desired output and presses the associated key to actuate the underlying switch. Upon sensing that the switch has been activated, the system determines if the user intended to activate the central function corresponding to the centrally placed graphic 10, or an auxiliary function corresponding to one of peripheral graphics 14, either by a signal from a single sensor 20 above a given threshold, or by relative sensor signal levels. As an example of the former type, referring to the embodiment of FIG. 1, if the capacitive value measured by the sensor 20 immediately between the buttons labeled "8" and "*" (i.e., the sensor labeled "n" in FIG. 3) is above a predetermined threshold when the sensor 20 underneath the number "8" is actuated, then the system will output letter "V". As an example of the latter type, if the capacitive value measured by the sensor 20 immediately between the buttons labeled "8" and "*" is disproportionately higher than the capacitive values measured at the other three sensors 20 immediately adjacent the "8" button when the sensor 20 underneath the number "8" is actuated, then the system will output letter "V". The algorithm may include the absence (or reduction) of a signal from the sensor 20 located on the opposite side from the intended auxiliary function graphic 14. The switch 30, particularly the tactile feedback metal dome element of switch 30, may be used as one side of the local capacitor.

Figure 4:
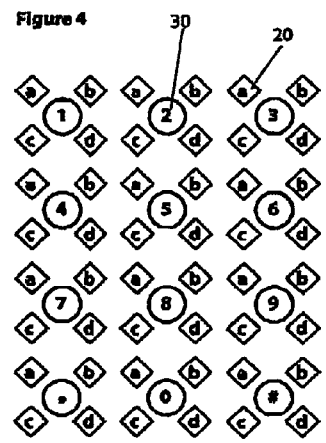

FIG. 4 shows another embodiment of the sensor 20 and switch 30 array, in which each switch 30 has an associated set of sensors 20 (labeled "a", "b", "c" and "d") in which each member of the set is duplicated around the other switches 30. That is to say that all of the sensors 20 labeled "a" are electrically equivalent to each other, in the sense that the control algorithm does not distinguish between activations of different ones of sensors "a". The same is true of the other three labeled sensors ("b", "c" and "d") of each sets. The result is that fewer connections with the controller are required, in this case only four. However, this embodiment requires more accurate analog processing than the embodiment of FIG. 3. The switch 30, particularly the tactile feedback metal dome element of switch 30, maybe used as one side of the local capacitor.

Figure 5:
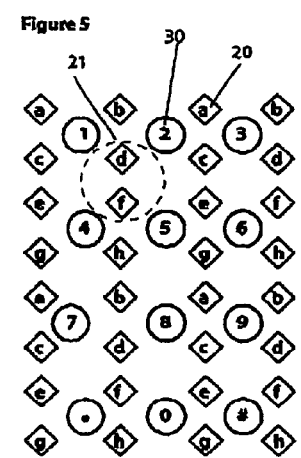

FIG. 5 shows an alternate embodiment of FIG. 4 in which alternate rows utilize different sets and adjacent sensors 20 within each row have been combined. As in FIG. 4, identically labeled sensors are electrically equivalent. But in this case, instead of each interstitial area 21 between switches 30 including the same four electrical entities (of sensors 20) differentiated by location within the interstitial area 21 (as in FIG. 4) adjacent rows of keys have unique sensors 20. In other words, the rows "1-2-3" and "7-8-9" each have corresponding sensors "a-b-c-d", while the rows "4-5-6" and "*-0-#" each have only sensors "e-f-g-h". This lowers the demands placed upon the electronics to accurately differentiate between the sensors 20 clustered together within each interstitial area 21. For example, the two sensors 20 to the lower right of the number "5" are "g" and "a", but as there is no instance of a type "a" sensor 20 that is supposed to be associated with the number "5", the control algorithm will properly produce an output corresponding to the combination of switch "5" and sensor "g" and will ignore the simultaneous activation of sensor "a" when the switch "5" is activated. The result is an easier standard for capacitive measurement and for output generation. The arrangement also allows the system to monitor for increased measurements of non-associated sensors. Using the same example, an increased signal measured on sensor "a" as switch "5" is pressed would indicate the user intended the output corresponding to the combination of switch "5" and sensor "g." By comparing measurements of these associated and non-associated sensors (and by knowing their relative positions and shapes) the system may better determine finger orientation and user intention.

Figure 6:
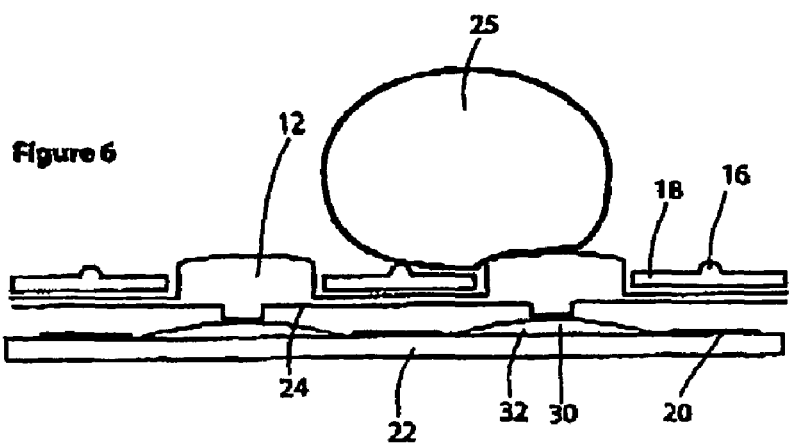
FIGS. 6–9 are cross-sectional views of a keypad, taken along line 6,7,8,9 of FIG. 3 and illustrating four alternative keypad constructions.

Referring to FIG. 6, sensors 20 are disposed on a printed circuit board 22 underlying a keymat 24 with keys 12 protruding through spaced holes in a relatively rigid housing 18. Also shown are switches 30, embodied here as metal domes. This figure also shows the interaction between the user's finger 25, as it presses off-center on the key 12 while in contact with the locator nub 16. Sensors 20 identify the location of the finger 25 with respect to key 12 at the moment switch 30 is activated. A differential measurement between the sensors 20 located on either side of a key 12 is an effective way to determine the intended position of the user's finger 25. If the differential measurement exceeds a threshold value, finger 25 is determined to be off-center and therefore seeking to activate the function identified by the auxiliary function graphic 14 located below the finger 25 and associated with the switch 30 activated at that moment.

Figure 7:
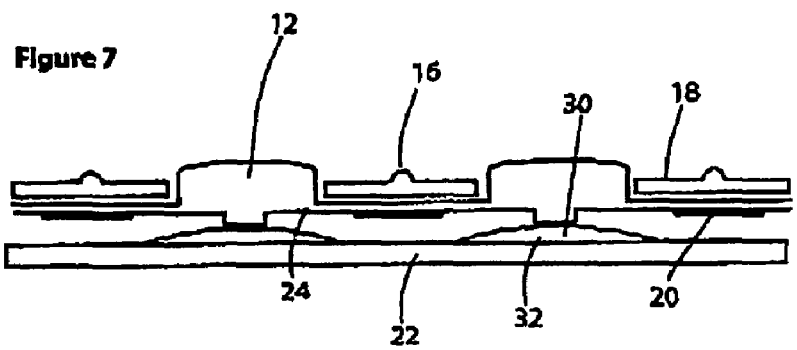
Figure 8:
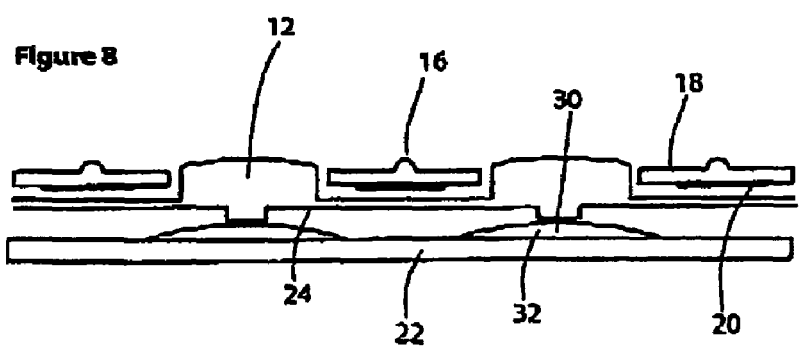
Figure 9:
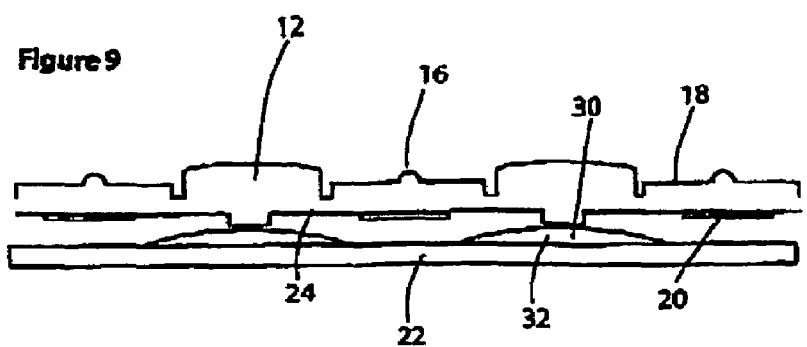

In the alternative configuration of FIG. 7, sensors 20 are disposed on the underside of keymat 24. Conductive traces (not shown) connect the array of sensors 20 to the printed circuit board 22. In another construction shown in FIG. 8, sensors 20 are disposed on the housing 18. Conductive traces connect the'sensors 20 to the PCB 22. FIG. 9 shows yet another configuration, in which the housing 18 is integrally molded with the keys 12 in a deflectable plastic, elastomeric or composite material. Conductive traces connect the sensors 20 to the PCB 22. In FIGS. 6–9, metal dome tactile feedback elements 32 provide both tactile feedback and switch operation. Also in FIGS. 6–9, tactile feedback elements 32 are made of stainless steel domes and electrically integrated with the operation of sensors 20 by acting as a first side of a capacitor in which the second side of the capacitor is provided by sensor 20.

A number of embodiments of the invention have been described. Nevertheless, it will be understood that various modifications may be made without departing from the spirit and scope of the invention. Accordingly, other embodiments are within the scope of the following claims.

What is claimed is:

1. A keypad having an array of keys each having an associated central function and one or more associated peripheral functions, the central function of each of the keys activated by manually engaging a central region of the key, while each of the peripheral functions is activated by manually engaging a corresponding peripheral region of the key, wherein the keypad comprises an array of at-a-distance finger position sensors that are each responsive to an offset position of a finger activating a switch of at least one corresponding of the keys of the array.

2. The keypad of claim 1, wherein the finger position sensors are disposed between adjacent ones of the keys.

3. The keypad of claim 1, wherein each of the keys provides more than two functions, and wherein more than one of the position sensors are disposed adjacent each of the keys, each of the position sensors corresponding to a different key output.

4. The keypad of claim 1, wherein the finger position sensors detect finger position by changes in electrical capacitance.

5. The keypad of claim 1, wherein each of the finger position sensors is located approximately equidistant between respective pairs of the keys.

6. The keypad of claim 1, wherein the key array defines interstitial areas between adjacent sets of four of the keys, each of the interstitial areas containing two of the finger position sensors.

7. The keypad of claim 1, wherein the key array defines interstitial areas between adjacent sets of four of the keys, each of the interstitial areas containing four of the finger position sensors.

8. The keypad of claim 1, wherein each of the keys is labeled with a central graphic corresponding to the associated central function of the key.

9. The keypad of claim 8, wherein each of the keys is also labeled with peripheral graphics corresponding to the peripheral functions associated with the key.

10. The keypad of claim 8, labeled with peripheral graphics adjacent each of the keys, corresponding with the peripheral functions associated with the key.

11. The keypad of claim 1, comprising discrete switches that underlie associated ones of the keys and that are activated in an absence of any other input to produce an output associated with the central function of the key.

12. The keypad of claim 11 wherein the switches comprise snap domes.

13. The keypad of claim 11, wherein the peripheral functions are activated by capacitively sensing finger position between an associated one of the key switches and an adjacent one of the finger position sensors.

14. The keypad of claim 13, wherein each of the switches acts as a first side of a capacitor corresponding to a peripheral function, and each of the sensors acts as a second side of the capacitor corresponding to one of the peripheral functions.

15. The keypad of claim 1, wherein the keypad is a keymat assembled into a housing defining apertures through which individual ones of the keys of the keymat project.

16. The keypad of claim 15, wherein the finger position sensors are disposed on an underside of the housing or on a surface of the keymat.

17. The keypad of claim 1, wherein each of the keys has four peripheral functions.

18. The keypad of claim 1, further comprising tactile elements between the keys at an exposed surface of the keypad.

19. The keypad of claim 18, wherein the tactile elements comprise nubs projecting from the exposed surface of the keypad.

20. A method of determining user input from a keypad having a defined set of physical keys and in a housing, each of the keys having an underlying electrical switch, the method including detecting activation of one of the switches corresponding to one of the keys;

detecting finger position with respect to a central region of the key corresponding to the activated switch, based on signals from an array of at-a-distance finger sensors within the keypad;

upon detecting a finger position offset from the central region of the key, providing an output corresponding to a peripheral function associated with the key, otherwise, providing an output corresponding to a central function associated with the key.

21. The method of claim 20, wherein each of the keys is labeled both with a graphic corresponding to the central function of the key and one or more graphics corresponding with the peripheral functions of the key.

22. The method of claim 20, wherein each of the keys is labeled with a graphic corresponding to the central function of the key, and the housing is labeled with graphics corresponding with the peripheral functions of the keys.

23. The method of claim 20, wherein the keypad comprises tactile elements at an exposed surface of the keypad for helping a user position a finger with respect to a given one of the keys.

24. The method claim 20 wherein each of the switches acts as a first side of a capacitor corresponding to the peripheral function, and each of the sensors acts as a second side of the capacitor corresponding to the peripheral function.

* * * * *